United States Patent
Su et al.

(10) Patent No.: US 12,316,864 B1
(45) Date of Patent: May 27, 2025

(54) NEUTRAL COLOR PRESERVATION FOR SINGLE-LAYER BACKWARD COMPATIBLE CODEC

(71) Applicant: Dolby Laboratories Licensing Corporation, San Francisco, CA (US)

(72) Inventors: Guan-Ming Su, Fremont, CA (US); Tsung-Wei Huang, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/865,902

(22) PCT Filed: May 17, 2023

(86) PCT No.: PCT/US2023/022581
§ 371 (c)(1),
(2) Date: Nov. 14, 2024

(87) PCT Pub. No.: WO2023/229898
PCT Pub. Date: Nov. 30, 2023

Related U.S. Application Data

(60) Provisional application No. 63/345,161, filed on May 24, 2022.

(30) Foreign Application Priority Data

May 24, 2022 (EP) ..................... 22175096

(51) Int. Cl.
| | | |
|---|---|---|
| H04N 19/00 | (2014.01) | |
| G06T 5/40 | (2006.01) | |
| G06T 7/00 | (2017.01) | |
| G06T 7/90 | (2017.01) | |
| H04N 19/186 | (2014.01) | |
| H04N 19/98 | (2014.01) | |

(52) U.S. Cl.
CPC ............. *H04N 19/186* (2014.11); *G06T 5/40* (2013.01); *G06T 7/90* (2017.01); *H04N 19/98* (2014.11)

(58) Field of Classification Search
CPC ........ H04N 19/186; H04N 19/98; G06T 7/90; G06T 5/40
See application file for complete search history.

(56) References Cited

U.S. PATENT DOCUMENTS

| | | |
|---|---|---|
| 8,811,490 B2 | 8/2014 | Su |
| 11,277,627 B2 | 3/2022 | Song |
| 2018/0242006 A1* | 8/2018 | Kerofsky ............... H04N 19/85 |
| 2021/0195221 A1* | 6/2021 | Song ................... H04N 19/154 |
| 2023/0171436 A1* | 6/2023 | Song ................... H04N 19/186 |

FOREIGN PATENT DOCUMENTS

WO    2021076822 A1    4/2021

OTHER PUBLICATIONS

SMPTE ST 2084:2014 "High Dynamic Range EOTF of Mastering Reference Displays" Aug. 16, 2014, pp. 1-15, 15 pages.

* cited by examiner

*Primary Examiner* — Zhihan Zhou

(57) ABSTRACT

Novel methods and systems for processing a single-layer backward compatible codec with multiple-channel multiple regression coefficients either provided in or pointed to in metadata such that the coefficients have been biased to prevent a shift in neutral colors. Pseudo neutral color patches are used along with a saturation weighting factor to bias the coefficients.

15 Claims, 6 Drawing Sheets

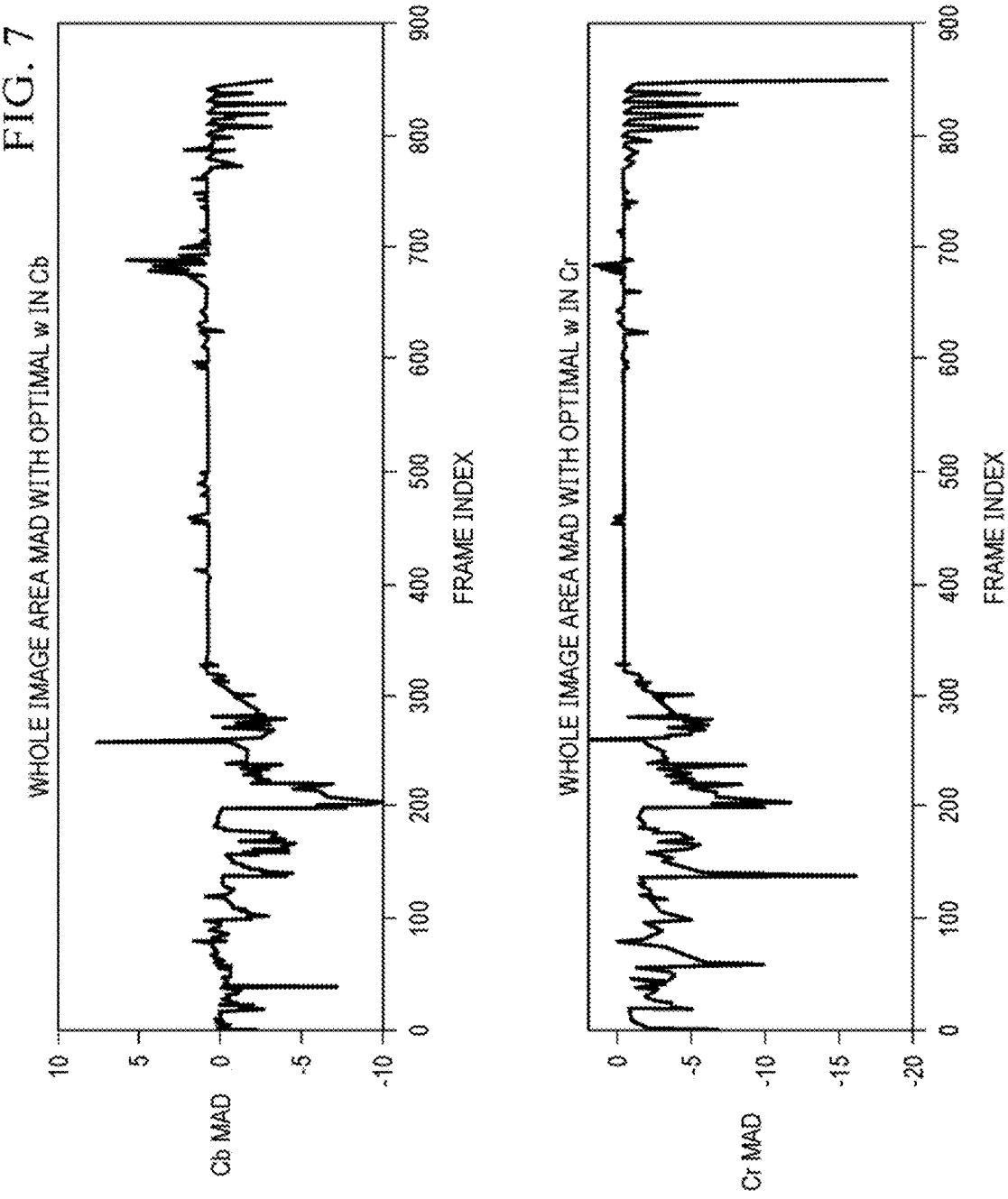

NEUTRAL COLOR PRESERVATION FOR SINGLE-LAYER BACKWARD COMPATIBLE CODEC

CROSS-REFERENCE TO RELATED APPLICATIONS

This application is a U.S. National Stage application under U.S.C. 371 of International Application No. PCT/US2023/022581, filed on May 17, 2023, which claims the benefit of priority to European patent application 22 175 096.1 (reference: D22021EP), and U.S. Provisional patent application Ser. No. 63/345,161 (reference: D22021USP1), both filed on 24 May 2022, each of which is incorporated by reference in its entirety.

TECHNICAL FIELD

The present disclosure relates generally to images. More particularly, an embodiment of the present invention relates to preserving the neutral color in single-layer backward compatible codecs.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g., interchangeably.

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). For example, using gamma luminance coding, images where n≤8 (e.g., color 24-bit JPEG images) are considered images of standard dynamic range, while images where n≥10 may be considered images of enhanced dynamic range. HDR images may also be stored and distributed using high-precision (e.g., 16-bit) floating-point formats, such as the OpenEXR™ file format developed by Industrial Light and Magic™.

Most consumer desktop displays currently support luminance of 200 to 300 cd/m² or nits. Most consumer HDTVs range from 300 to 500 nits with new models reaching 1,000 nits (cd/m²). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200™ professional reference monitor from Dolby Laboratories™), HDR content may be color graded and displayed on HDR displays that support higher dynamic ranges (e.g., from 1,000 nits to 5,000 nits or more).

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

As used herein, multiple-channel multiple regression (MMR) refers to methods that allow an encoder to approximate/predict a higher dynamic range image (e.g., HDR) in terms of a given lower dynamic range image (e.g., SDR) and an MMR model. Examples are provided in U.S. Pat. No. 8,811,490 "Multiple Color Channel Multiple Regression Predictor" by Guan-Ming Su et al., incorporated by reference in its entirety herein.

As used herein, single-layer backward compatible (SLBC) refers to a single-layer encoding system that supports both a higher and lower dynamic range display. This can be accomplished by the use of MMR coefficients provided in metadata, either directly (e.g., coefficients as data) or indirectly (e.g., a pointer to one of several pre-generated MMR models). An example is provided in U.S. Pat. No. 11,277,627 "High-Fidelity Full Reference And High-Efficiency Reduced Reference Encoding In End-To-End Single-Layer Backward Compatible Encoding Pipeline" by Qing Song et al., incorporated by reference in its entirety herein.

As used herein, "d3DMT" refers to a dynamic 3D mapping table. The d3DMT is built from the HDR image and the SDR image for forward reshaping chroma codewords in the HDR image to reshaped chroma codewords in the reshaped SDR image to achieve a relatively high (e.g., the highest, etc.) fidelity of perceived color. An example is shown in U.S. Pat. No. 11,277,627 as referenced above.

WO 2021/076822 A1 discloses a method for encoding forward reshaped image data in a video signal. A backward reshaping mapping table is initially generated as an inverse of a forward reshaping mapping table. The backward reshaping mapping table is updated by replacing the content-mapped luminance codewords with forward reshaped luminance codewords generated by applying a luminance forward mapping to the sampled luminance codewords. The luminance forward mapping is constructed from the forward reshaping mapping table. The backward reshaping mapping table and the luminance forward mapping are used to generate backward reshaping mappings for creating a reconstructed image from a forward reshaped image. The forward reshaped image is encoded, in a video signal, along with image metadata specifying the backward reshaping mappings. A recipient device of the video signal applies the backward reshaping mappings to the forward reshaped image to create the reconstructed image of the second dynamic range.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

The invention is defined by the independent claims. The dependent claims concern optional features of some embodiments. An embodiment for achieving neutral color preservation comprises a method of building a dynamic 3D mapping table (d3DMT) from a first reference image and a second reference image, the first reference image having a higher dynamic range than the second reference image; computing content color matrices based on the d3DMT; computing a content saturation from the d3DMT; computing at least one weighting factor from the content saturation; building a neutral color set; computing neutral color matrices based on the neutral color set; combining the content color matrices, the at least one weighting factor, and the neutral color matrices to solve multiple-channel multiple regression (MMR) coefficients; and providing metadata containing data related to the MMR coefficients to a decoder to allow backward compatibility for a single-layer bitstream.

The method can be programmed/built into an encoder as a codec.

The systems and methods are not limited to the above embodiments and further details and embodiments are provided in the description and drawings provided herein.

BRIEF DESCRIPTION OF DRAWINGS

FIG. 7 illustrates an example graphs of whole image area MAD with optimal weighting factor in Cb and Cr.

DETAILED DESCRIPTION

As used herein, "neutral color" refers to the center (0.5 on a nonnalized range from 0 to 1) of all color axes (e.g., Cb=0.5 and Cr=0.5 in the normalized YCbCr domain).

Figure 1:
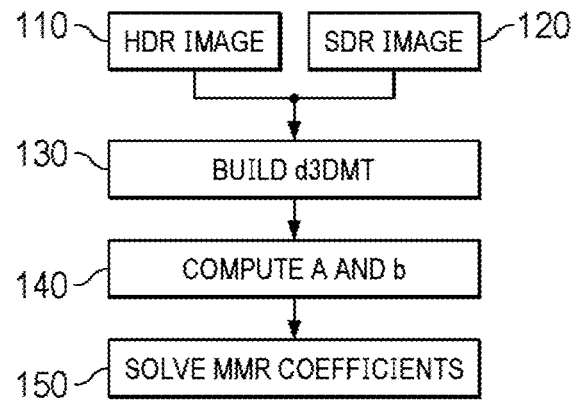
FIG. 1 illustrates an example of the prior art SLBC codec without neutral color preservation.

An SLBC algorithm consists of two paths, forward path which maps input higher dynamic range images (e.g., herein HDR) to a lower dynamic range image (e.g., herein SDR), and backward path which maps SDR back to HDR. FIG. 1 shows an example SLBC based on using d3DMT to compute MMR coefficients to be used in image prediction for the SLBC codec. A reference HDR image (110) and a corresponding reference SDR image (120) are used to build a dynamic 3d mapping table (130). From this a matrix (described herein as A) and a vector (described herein as b) are computed (140) which solve the MMR coefficients (described herein as m) (150).

Building the d3DMT

Denote the $i^{th}$ pixel of the reference HDR image frame as $(v_i^y, v_i^{cb}, v_i^{cr})$ for 3 color channel (y, cb, cr), the corresponding reference SDR image as $(s_i^y, s_i^{cb}, s_i^{cr})$ (frame index i is dropped for now, but will be added back in solving the MMR coefficients). The pixel values are normalized to [0 1] and there are P pixels in one image. The forward path (HDR to SDR) is used as an example here, but the backward path (SDR to HDR) can be derived in the same process.

Denote the number of bins $Q_y$, $Q_{cb}$, $Q_{cr}$ for each component. Compute the $(Q_y \times Q_{cb} \times Q_{cr})$ 3D histogram. Let the 3D histogram bin in HDR denoted by $\Omega_q^{Q,v}$, where $Q=[Q_y, Qc_{cb}, Q_{cr}]$. Thus, $\Omega_q^{Q,v}$ contains total $(Q=Q_y \cdot Q_{Cb} \cdot Q_{Cr})$ bins such that each 3D bin specified by bin index $q=(q_y, q_{Cb}, q_{Cr})$, represents the number of pixels having those 3-channel quantized values.

For each channel, compute the minimum ($L^{v,ch}$) and maximum ($H^{v,ch}$) for the HDR image signal as:

$$L^{v,ch} = \min_i(v_i^{ch}) \qquad \text{equation (1)}$$

$$H^{v,ch} = \max_i(v_i^{ch}) \qquad \text{equation (2)}$$

Each channel is uniformly quantized into $Q_{ch}$ bins based on the min and max. The range of bin j is:

$$[L^{v,ch}+j\cdot g^{ch}, L^{v,ch}+(j+1)\cdot g^{ch}), j \in \{0,1,\ldots,Q_{ch}-1\}. \quad \text{equation (3)}$$

where $$g^{ch} = \frac{H^{v,ch} - L^{v,ch}}{Q_{ch}}. \quad \text{equation (4)}$$

For a given input HDR value, the bin index can be determined by:

$$q_{ch} = \left\lfloor \frac{v_i^{ch} - L^{v,ch}}{g^{ch}} \right\rfloor \quad \text{equation (5)}$$

Compute the HDR sums in each HDR 3D bin as $\Psi_Y^{Q,v}$ $\Psi_{Cb}^{Q,v}$ and $\Psi_{Cr}^{Q,v}$. Also compute the SDR sums in each HDR 3D bin. Let $\Psi_Y^{Q,s}$ $\Psi_{Cb}^{Q,s}$ and $\Psi_{Cr}^{Q,s}$ be the mapped SDR luma and chroma values such that each bin of these contains the sum of all SDR color channel pixel values where the corresponding HDR pixel value lies in that bin.

Here is an example of this operation:

STEP 1: 3D SDR histogram and 3D-mapped HDR chroma values initialization:

$\Omega_q^{Q,v}=0$ where $q=(q_y, q_{Cb}, q_{Cr})$ and $q=0,\ldots,Q-1$ $\Psi_{Y,q}^{Q,v}=0$ where $q=(q_y, q_{Cb}, q_{Cr})$ and $q=0,\ldots,Q-1$ $\Psi_{Cb,q}^{Q,v}9=0$ where $q=(q_y, q_{Cb}, q_{Cr})$ and $q=0,\ldots,Q-1$ $\Psi_{Cr,q}^{Q,v}9=0$ where $q=(q_y, q_{Cb}, q_{Cr})$ and $q=0,\ldots,Q-1$ $\Psi_{Cb,q}^{Q,s}=0$ where $q=(q_y, q_{Cb}, q_{Cr})$ and $q=0,\ldots,Q-1$ $\Psi_{Cb,q}^{Q,s}=0$ where $q=(q_y, q_{Cb}, q_{Cr})$ and $q=0,\ldots,Q-1$ $\Psi_{Cr,q}^{Q,s}=0$ where $q=(q_y, q_{Cb}, q_{Cr})$ and $q=0,\ldots,Q-1$ STEP 2: scan for each pixel in HDR and SDR-chroma from each (i) of the P color patches:

$$q_y = \left\lfloor \frac{v_i^y - L^{v,y}}{g^y} \right\rfloor;$$

// HDR downsampled-luma quantized value $$q_{Cb} = \left\lfloor \frac{v_i^{cb} - L^{v,cb}}{g^{cb}} \right\rfloor;$$

// HDR chroma 0 quantized value $$q_{Cr} = \left\lfloor \frac{v_i^{cr} - L^{v,cr}}{g^{cr}} \right\rfloor;$$

// HDR chroma 1 quantized value $q=(q_y, q_{Cb}, q_{Cr})$, $\Omega_q^{Q,v}$++; // 3D HDR histogram $\Psi_{Y,q}^{Q,v} = \Psi_{Y,q}^{Q,v} + v_i^y$; // HDR Y values $\Psi_{Cb,q}^{Q,v} = \Psi_{Cb,q}^{Q,v} + v_i^{cb}$; // HDR Cb values $\Psi_{Cr,q}^{Q,v} = \Psi\Psi_{Cr,q}^{Q,v} + v_i^{cr}$; // HDR Cr values $\Psi_{Y,q}^{Q,s} = \Psi_{Y,q}^{Q,s} + s_i^y$; // SDR Y values $\Psi_{Cb,q}^{Q,s} = \Psi_{Cb,q}^{Q,s} + s_i^{cb}$; // SDR Cb values $\Psi_{Cr,q}^{Q,s} = \Psi_{Cr,q}^{Q,s} + s_i^{cr}$; // SDR Cr values Now, find the 3D HDR histogram bins that have non-zero number of pixels. In other words, discard all those bins that do not have any pixels. Let $q_0, q_1, \ldots, q_{K-1}$ be K such bins for which, $\Omega_q^{Q,v} \neq 0$. Compute the averages for HDR ($\Psi_Y^{Q,v}$, $\Psi_{Cb}^{Q,v}$, $\Psi_{Cr}^{Q,v}$) and SDR ($\Psi_Y^{Q,s}$, $\Psi_{Cb}^{Q,s}$, $\Psi_{Cr}^{Q,s}$) as shown below:

Set for each bin the SDR mapping values (the non-zero bin index $q_i=(q_y, q_{Cb}, q_{Cr})$), for each (i) of the K bins:

$$\overline{\Psi}_{Y,q_i}^{Q,v} = \frac{\Psi_{Y,q_i}^{Q,v}}{\Omega_{q_i}^{Q,v}};$$

// Average HDR Y values $$\overline{\Psi}_{Cb,q_i}^{Q,v} = \frac{\Psi_{Cb,q_i}^{Q,v}}{\Omega_{q_i}^{Q,v}};$$

// Average HDR Cb values $$\overline{\Psi}_{Cr,q_i}^{Q,v} = \frac{\Psi_{Cr,q_i}^{Q,v}}{\Omega_{q_i}^{Q,v}};$$

// Average HDR Cr values $$\overline{\Psi}_{Y,q_i}^{Q,s} = \frac{\Psi_{Y,q_i}^{Q,s}}{\Omega_{q_i}^{Q,v}};$$

// Average SDR Y values $$\overline{\Psi}_{Cb,q_i}^{Q,s} = \frac{\Psi_{Cb,q_i}^{Q,s}}{\Omega_{q_i}^{Q,v}};$$

// Average SDR Cb values $$\Psi_{Cr,q_i}^{Q,s} = \frac{\Psi_{Cr,q_i}^{Q,s}}{\Omega_{q_i}^{Q,v}};$$

// Average SDR Cr values
All mapping pairs $$\left(\Psi_{Y,q_i}^{Q,v}, \Psi_{Cb,q_i}^{Q,v}, \Psi_{Cr,q_i}^{Q,v}\right) \to \left(\Psi_{Y,q_i}^{Q,s}, \Psi_{Cb,q_i}^{Q,s}, \Psi_{Cr,q_i}^{Q,s}\right)$$

can be collected to construct the d3DMT.

Construction of MMR Coefficients

The forward path is for HDR to SDR conversion (higher dynamic range to lower), with the backward path being from lower to higher dynamic range. Different MMR coefficients can be used for the forward and backward paths, or both paths can be given the same MMR coefficients based on the more important path (e.g., only the forward path is computed, then used for both paths, if HDR to SDR conversion is prioritized).

Forward Path

Denote the MMR expanded form for the $i^{th}$ HDR entry in d3DMT as $$\left(\Psi_{t,Y,q_i}^{Q,v}, \Psi_{t,Cb,q_i}^{Q,v}, \Psi_{t,Cr,q_i}^{Q,v}\right) \to \left(\Psi_{t,Y,q_i}^{Q,s}, \Psi_{t,Cb,q_i}^{Q,s}, \Psi_{t,Cr,q_i}^{Q,s}\right)$$

at frame t as:

$$\overline{v}_{t,i} = \begin{bmatrix} 1 & \Psi_{t,Y,q_i}^{Q,v} & \Psi_{t,Cb,q_i}^{Q,v} & \Psi_{t,Cr,q_i}^{Q,v} & \cdots & \Psi_{t,Y,q_i}^{Q,v}\Psi_{t,Cb,q_i}^{Q,v} & \cdots & \left(\Psi_{t,Y,q_i}^{Q,v}\Psi_{t,Cb,q_i}^{Q,v}\right)^2 & \cdots & \left(\Psi_{t,Cb,q_i}^{Q,v}\right)^2 & \left(\Psi_{t,Cr,q_i}^{Q,v}\right)^2 \cdots \end{bmatrix} \quad \text{equation (6)}$$

All non-zero $K_t^F$ entries can be collected together as:

$$V_t^{(F)} = \begin{bmatrix} \overline{v}_{t,0} \\ \overline{v}_{t,1} \\ \vdots \\ \overline{v}_{t,K_t^F-1} \end{bmatrix} \quad \text{equation (7)}$$

The observation chroma signal (e.g., ch can be Cb channel or Cr channel) can be expressed as:

$$s_t^{ch,(F)} = \begin{bmatrix} \Psi_{t,ch,q_0}^{Q,s} \\ \Psi_{t,ch,q_1}^{Q,s} \\ \vdots \\ \Psi_{t,ch,q_{K_t^F-1}}^{Q,s} \end{bmatrix} \quad \text{equation (8)}$$

Denote the $ch^{th}$ channel of MMR coefficients as $m_t^{ch,(F)}$. The predicted SDR signal is $$\hat{s}d_t^{ch,(F)} = v_t^{(F)} m_t^{ch,(F)} \quad \text{equation (9)}$$

The optimal solution can be obtained via least squared solution:

$$m_t^{ch,(F),opt} = \operatorname{argmin}\left\|\hat{s}_t^{ch,(F)} - s_t^{ch,(F)}\right\| = \operatorname{argmin}\left\|V_t^{(F)} m_t^{ch,(F)} - s_t^{ch,(F)}\right\| \quad \text{equation (10)}$$

which can be solved as:

$$m_t^{ch,(F),opt} = ((V_t^{(F)})^T(V_t^{(F)}))^{-1}((V_t^{(F)})^T s_t^{ch,(F)}) \quad \text{equation (11)}$$

To simply the discussion, further denote the following notations:

$$A_t^{(F),CC} = (V_t^{(F)})^T(V_t^{(F)}) \text{ and } b_t^{ch,(F),CC} = (V_t^{(F)})^T s_t^{ch,(F)} \quad \text{equation (12)}$$

giving the forward coefficients as:

$$m_t^{ch,(F),opt} = (A_t^{(F),CC})^{-1}(b_t^{ch,(F),CC}). \quad \text{equation (13)}$$

Backward Path

The MMR coefficients for the backward path can be computed via essentially the same process as the forward path. With the predicted SDR image and having constructed the d3DMT from a predicted SDR $$\left(\Psi_{t,Y,q_i}^{Q,s}, \Psi_{t,Cb,q_i}^{Q,s}, \Psi_{t,Cr,q_i}^{Q,s}\right)$$

to original HDR image $$\left(\Psi_{t,Y,q_i}^{Q,v}, \Psi_{t,Cb,q_i}^{Q,v}, \Psi_{t,Cr,q_i}^{Q,v}\right)$$

at frame t. The MMR expanded form for the $i^{th}$ entry can be expressed as:

$$\overline{s}_{t,i} = \begin{bmatrix} 1 & \Psi_{t,Y,q_i}^{Q,s} & \Psi_{t,Cb,q_i}^{Q,s} & \Psi_{t,Cr,q_i}^{Q,s} & \cdots & \Psi_{t,Y,q_i}^{Q,s}\Psi_{t,Cb,q_i}^{Q,s} & \cdots & \left(\Psi_{t,Y,q_i}^{Q,s}\Psi_{t,Cb,q_i}^{Q,s}\right)^2 & \cdots & \left(\Psi_{t,Cb,q_i}^{Q,s}\right)^2 & \left(\Psi_{t,Cr,q_i}^{Q,s}\right)^2 \cdots \end{bmatrix} \quad \text{equation (14)}$$

Collecting all non-zero $K_t^B$ entries together as:

$$\hat{S}_t^{(B)} = \begin{bmatrix} \overline{s}_{t,0} \\ \overline{s}_{t,1} \\ \vdots \\ \overline{s}_{t,K_t^B-1} \end{bmatrix} \quad \text{equation (15)}$$

The observation chroma signal (e.g., ch can be Cb channel or Cr channel) can be expressed as:

$$v_t^{ch,(B)} = \begin{bmatrix} \Psi_{t,ch,q_0}^{Q,v} \\ \Psi_{t,ch,q_1}^{Q,v} \\ \vdots \\ \Psi_{t,ch,q_{K_t^B-1}}^{Q,v} \end{bmatrix} \quad \text{equation (16)}$$

Denote the $ch^{th}$ channel of MMR coefficients as $m_t^{ch,(B)}$. The predicted HDR signal is $$\hat{v}_t^{ch,(B)} = \hat{S}_t^{(B)} m_t^{ch,(B)} \quad \text{equation (17)}$$

The optimal solution can be obtained via least squared solution $$m_t^{ch,(B),opt} = \quad \text{equation (18)}$$
$$\arg\min \|\hat{v}_t^{ch,(B)} - v_t^{ch,(B)}\| = \arg\min \|\hat{S}_t^{(B)} m_t^{ch,(B)} - v_t^{ch,(B)}\|$$

This can be solved using a least squared solution algorithm.

$$m_t^{ch,(B),opt} = ((\hat{S}_t^{(B)})^T(\hat{S}_t^{(B)}))^{-1}((\hat{S}_t^{(B)})^T v_t^{ch,(B)}) \quad \text{equation (19)}$$

To simply the discussion, we further denote the following notations:

$$A_t^{(B),CC} = (\hat{S}_t^{(B)})^T(\hat{S}_t^{(B)}) \text{ and } b_t^{ch,(B),CC} = (\hat{S}_t^{(B)})^T v_t^{ch,(B)} \quad \text{equation (20)}$$

$$m_t^{ch,(B),opt} = (A_t^{(B),CC})^{-1}(b_t^{ch,(B),CC}) \quad \text{equation (21)}$$

The processes above produce MMR coefficients that can be biased to whatever the majority color is in the reference image, depending on the color distribution. This can cause a tinting in the neutral color, meaning that the neutral color is not accurately preserved. Generally, the more saturated an image is, the greater the chance in a neutral color shift. This can be corrected by introducing a set of hypothetical neutral color patches into the MMR optimization procedure to provide an efficient solution to alleviate the neutral color shift issue.

Neutral Color Preservation

Figure 2:
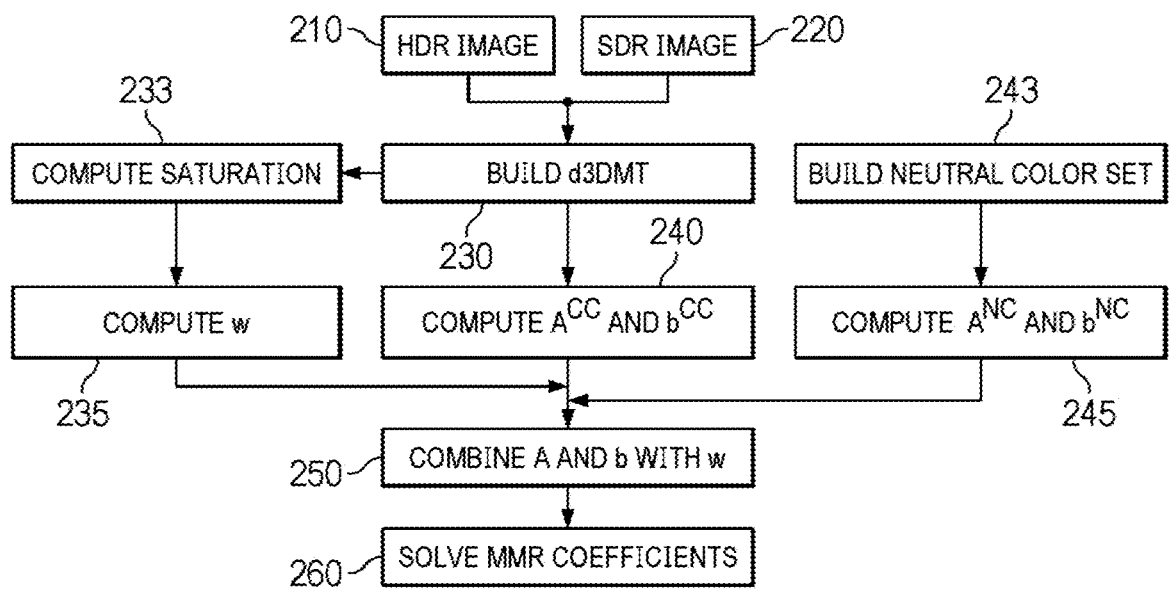
FIG. 2 illustrates an example of an SLBC codec with neutral color preservation.

FIG. 2 shows an embodiment of an improved SLBC algorithm that addresses the neutral color shift issue. As with the previous process, an HDR image (210) and an SDR image (220) are used to create a d3DMT (230). However, two extra elements are added: 1) computing a saturation of the d3DMT (233) and computing a matrix of weighing values w (235) from the saturation; and 2) building a neutral color set from neutral color patches added to the image (243) and computing additional A and b matrices from the patches (245). The additional matrices (w, $A^{NC}$, $b^{NC}$) are then combined with the usual content color matrices ($A^{CC}$ and $b^{CC}$) (250) to solve for MMR coefficients (260) that, as a result of the above, have been biased to preserve neutral colors.

In other words, the left side of the flowchart (210, 220, 230, 233, 235, 240) shows the "nature image" path (for content color, or "CC"). By a given HDR-SDR nature image pair (210, 220), first build the d3DMT (230). Based on the forward d3DMT, compute $A_t^{(F),CC}$ and, $b_t^{ch,(F),CC}$ (240). Also re-use the d3DMT (230) to compute the content saturation $\beta_t^{(F)}$ (233). The required weighting factor can be found via function $f(\beta_t^{(F)})$ (235). Based on the backward d3DMT, compute $A_t^{(B),CC}$ an $b_t^{(B),CC}$ (240); and compute the content saturation $\beta_t^{(B)}$ (233).

The right side of flowchart (243, 245) shows the (added) neutral color ("NC") path. Build the $A_t^{(F),NC} b_t^{ch,(F),NC}$ (245) as described herein. The backward path can be computed in the same process as $A_t^{(B),NC}$ and $b_t^{ch,(B),NC}$ In some embodiments, the system or method includes the neutral color path without weighting factors. In some embodiments, as shown in FIG. 2, the system or method includes both the nature image path the neutral color path with weighting factors.

Then, combine (250) the nature image and neutral color patch using the following equations for forward path and backward path individually:

$$A_t^{(F)} = A_t^{(F),CC} + W^{(F)} \cdot A_t^{(F),NC} \quad \text{equation 22)}$$

$$b_t^{ch,(F)} = b_t^{ch,(F),CC} + w^{(F)} \cdot b_t^{ch,(F),NC} \quad \text{equation (23)}$$

$$A_t^{(B)} = A_t^{(B),CC} + w^{(B)} \cdot A_t^{(B),NC} \quad \text{equation (24)}$$

$$b_t^{ch,(B)} = b_t^{ch,(B),CC} + w^{(B)} \cdot b_t^{ch,(B),NC} \quad \text{equation (25)}$$

The forward and backward MMR coefficients can be solved:

$$m_t^{ch,(F),opt} = (A_t^{(F)})^{-1}(b_t^{ch,(F)}) \quad \text{equation (26)}$$

$$m_t^{ch,(B),opt} = (A_t^{(B)})^{-1}(b_t^{ch,(B)}) \quad \text{equation (27)}$$

To bias the MMR coefficient optimization more toward neutral color preservation, modify the matrix, $A_t^{(F)}$, $b_t^{ch,(F)}$, $A_t^{(B)}$, and $b_t^{ch,(B)}$. The modification (bias) starts from building N pseudo neutral color patches which do not occur in the content (images).

Forward Path Bias

For the forward path, assign the $i^{th}$ color patch, $i = 0, \ldots, N-1$, as:

$$v_{t,i}^{y,NC} = i \cdot 1/N \quad \text{equation (28)}$$

$$v_{t,i}^{cb,NC} = 0.5 \quad \text{equation (29)}$$

$$v_{t,i}^{cr,NC} = 0.5 \quad \text{equation (30)}$$

and $$s_{t,i}^{cb,NC} = 0.5 \quad \text{equation (31)}$$

$$s_{t,i}^{cr,NC} = 0.5 \quad \text{equation (32)}$$

The MMR expanded form for the $i^{th}$ HDR neutral color patch as $$\bar{v}_{t,i}^{NC} = \quad \text{equation (33)}$$

$$\begin{bmatrix} 1 & v_{t,i}^{y,NC} & v_{t,i}^{cb,NC} & v_{t,i}^{cr,NC} & \cdots & v_{t,i}^{y,NC} v_{t,i}^{cb,NC} & \cdots & (v_{t,i}^{y,NC} v_{t,i}^{cb,NC})^2 & \cdots & (v_{t,i}^{cb,NC})^2 & (v_{t,i}^{cr,NC})^2 & \cdots \end{bmatrix}$$

All N color patches can be collected together as:

$$V_t^{(F),NC} = \begin{bmatrix} v_{t,0}^{NC} \\ v_{t,1}^{NC} \\ \vdots \\ v_{t,N-1}^{NC} \end{bmatrix} \quad \text{equation (34)}$$

The observation chroma signal (e.g., ch can be Cb channel or Cr channel) can be expressed as:

$$s_t^{ch,(F),NC} = \begin{bmatrix} 0.5 \\ 0.5 \\ \vdots \\ 0.5 \end{bmatrix} \quad \text{equation (35)}$$

Given the following matrixes:

$$A_t^{(F),NC} = (V_t^{(F),NC})^T (V_t^{(F),NC}) \quad \text{and} \quad b_t^{ch,(F),NC} = (V_t^{(F),NC})^T s_t^{ch,(F),NC} \quad \text{equation (36)}$$

the final A matrix and b vector will be linear combined via weighting factor $w^{(F)}$.

$$A_t^{(F)} = A_t^{(F),CC} + w^{(F)} \cdot A_t^{(F),NC} \quad \text{equation (37)}$$

$$b_t^{ch,(F)} = b_t^{ch,(F),CC} + w^{(F)} \cdot b_t^{ch,(F),NC} \quad \text{equation (38)}$$

The MMR coefficients for the forward path can be solved as follows:

$$m_t^{ch,(F),opt} = (A_t^{(F)})^{-1} (b_t^{ch,(F)}) \quad \text{equation (39)}$$

Backward Path Bias

For the backward path, assign the $i^{th}$ color patch, i=0, . . . , N−1, as $$\hat{s}_{t,i}^{y,NC} = i \cdot 1/N \quad \text{equation (40)}$$

$$\hat{s}_{t,i}^{cb,NC} = 0.5 \quad \text{equation (41)}$$

$$\hat{s}_{t,i}^{cr,NC} = 0.5 \quad \text{equation (42)}$$

and $$v_{t,i}^{cb,NC} = 0.5 \quad \text{equation (43)}$$

$$v_{t,i}^{cr,NC} = 0.5 \quad \text{equation (44)}$$

The backward path is the same process. Denote the corresponding reference SDR image as $(\hat{s}_{t,i}^{y}, \hat{s}_{t,i}^{cb}, \hat{s}_{t,i}^{cr})$.

$$\bar{s}_{t,i}^{NC} = \quad \text{equation (45)}$$

$$\begin{bmatrix} 1 & \hat{s}_{t,i}^{y,NC} & \hat{s}_{t,i}^{cb,NC} & \hat{s}_{t,i}^{cr,NC} & \ldots & \hat{s}_{t,i}^{y,NC} \hat{s}_{t,i}^{cb,NC} & \ldots & (\hat{s}_{t,i}^{y,NC} \hat{s}_{t,i}^{cb,NC})^2 & \ldots & (\hat{s}_{t,i}^{cb,NC})^2 & (\hat{s}_{t,i}^{cr,NC})^2 & \ldots \end{bmatrix}$$

All N color patches can be collected together as:

$$\hat{S}_t^{(B),NC} = \begin{bmatrix} \bar{s}_{t,0}^{NC} \\ \bar{s}_{t,1}^{NC} \\ \vdots \\ \bar{s}_{t,N-1}^{NC} \end{bmatrix} \quad \text{equation (46)}$$

The observation chroma signal (e.g., ch can be Cb channel or Cr channel) can be expressed as $$v_t^{ch,(B),NC} = \begin{bmatrix} 0.5 \\ 0.5 \\ \vdots \\ 0.5 \end{bmatrix} \quad \text{equation (47)}$$

Given the following matrixes:

$$A_t^{(B),NC} = \quad \text{equation (48)}$$

$$(\hat{S}_t^{(B),NC})^T (\hat{S}_t^{(B),NC}) \quad \text{and} \quad b_t^{ch,(B),NC} = (\hat{S}_t^{(B),NC})^T v_t^{ch,(B),NC}$$

the final A matrix and b vector will be linear combined via weighting factor $w^{(B)}$:

$$A_t^{(B)} = A_t^{(B),CC} + w^{(B)} \cdot A_t^{(B),NC} \quad \text{equation (49)}$$

$$b_t^{ch,(B)} = b_t^{ch,(B),CC} + w^{(B)} \cdot b_t^{ch,(B),NC} \quad \text{equation (50)}$$

The MMR coefficients for the backward path can be solved as follows:

$$m_t^{ch,(B),opt} = (A_t^{(B)})^{-1} (b_t^{ch,(B)}) \quad \text{equation (51)}$$

Determining the Weighting Factor

As discussed in the previous sections, one needs to determine the weighting factor for the forward path $(w_t^F)$ and/or backward path $(w_t^B)$. One can use the empirical method (experimentation) to find out the optimal solution, as shown herein.

Content Saturation and Neutral Color Deviation

The content saturation plays a role in determining the weighting factor. Note that the neutral color has (Cb,Cr) value as (0.5, 0.5) in YCbCr domain. The distance between each color entry in $$d3DMT(\Psi_{t,Cb,q_i}^{Q,v}, \Psi_{t,Cr,q_i}^{Q,v})$$

to the closest neutral color axis (0.5, 0.5) can be measured as $$c_{t,i}^{(F)} = \sqrt{(\Psi_{t,Cb,q_i}^{Q,v} - 0.5)^2 + (\Psi_{t,Cr,q_i}^{Q,v} - 0.5)^2} \quad \text{equation (52)}$$

This is the chroma saturation for one entry. For all valid non-zero $K_t^F$ cubes, the average saturation can be computed as:

$$\beta_t^{(F)} = \frac{1}{K_t^F} \sum_i c_{t,i}^{(F)} \quad \text{equation (53)}$$

The average saturation $(\beta^{(F)})$ of full-grid uniformly sampled RGB color points in one particular color space (such as R.709/P3/R.2020) can be determined inside a container (e.g., R.2020). A wider color gamut will have a higher average saturation.

To see the impact of different values of weighting factors, place a grey-level bar with $N_h$ pixels in a known location in each test image. Since the location is known, measure the deviation from neutral color for that gray-level bar between the final reconstructed HDR image and neutral color point 0.5. Adopt the mean of absolute difference (MAD) for the chroma channels from the neutral color patch.

To simplify the design, set $w_t=w_t^{(F)}=w_t^{(B)}$. Denote the final reconstructed HDR pixel value as $(\hat{v}_{t,i}^{y,(w_t)}, \hat{v}_{t,i}^{cb,(w_t)}, \hat{v}_{t,i}^{cr,(w_t)})$ when applying the weighting factor as $w_t$. For the pixels inside the gray-level bar, the MAD can be computed as:

$$d_t^{ch}(w_t) = \frac{1}{N_b}\sum_i |\hat{v}_{t,i}^{ch,(w_t)} - 0.5| \qquad \text{equation (54)}$$

A larger value of $d_t^{ch}(w_t)$ implies larger deviation from the neutral color and has higher potential to introduce non-neutral color.

Compute the MAD for the entire chroma image between reconstructed HDR and source HDR for applying $w_t$ (e.g., $|\hat{v}_{t,i}^{ch,(w_t)} - v_{t,i}^{ch}|$) and without applying (e.g., $|\hat{v}_{t,i}^{ch,(0)} - v_{t,i}^{ch}|$) And then compute the difference between these two MADs.

$$D_t^{ch}(w_t) = \left(\frac{1}{N}\sum_i |\hat{v}_{t,i}^{ch,(w_t)} - v_{t,i}^{ch}|\right) - \left(\frac{1}{N}\sum_i |\hat{v}_{t,i}^{ch,(0)} - v_{t,i}^{ch}|\right) \qquad \text{equation (55)}$$

A negative value implies the chroma accuracy is actually improved with less distortion. A positive value means the chroma accuracy is degraded owing to the introducing of weighting factor.

Data Analysis—Empirical Method for Determining Weighting Factor

Figure 3:
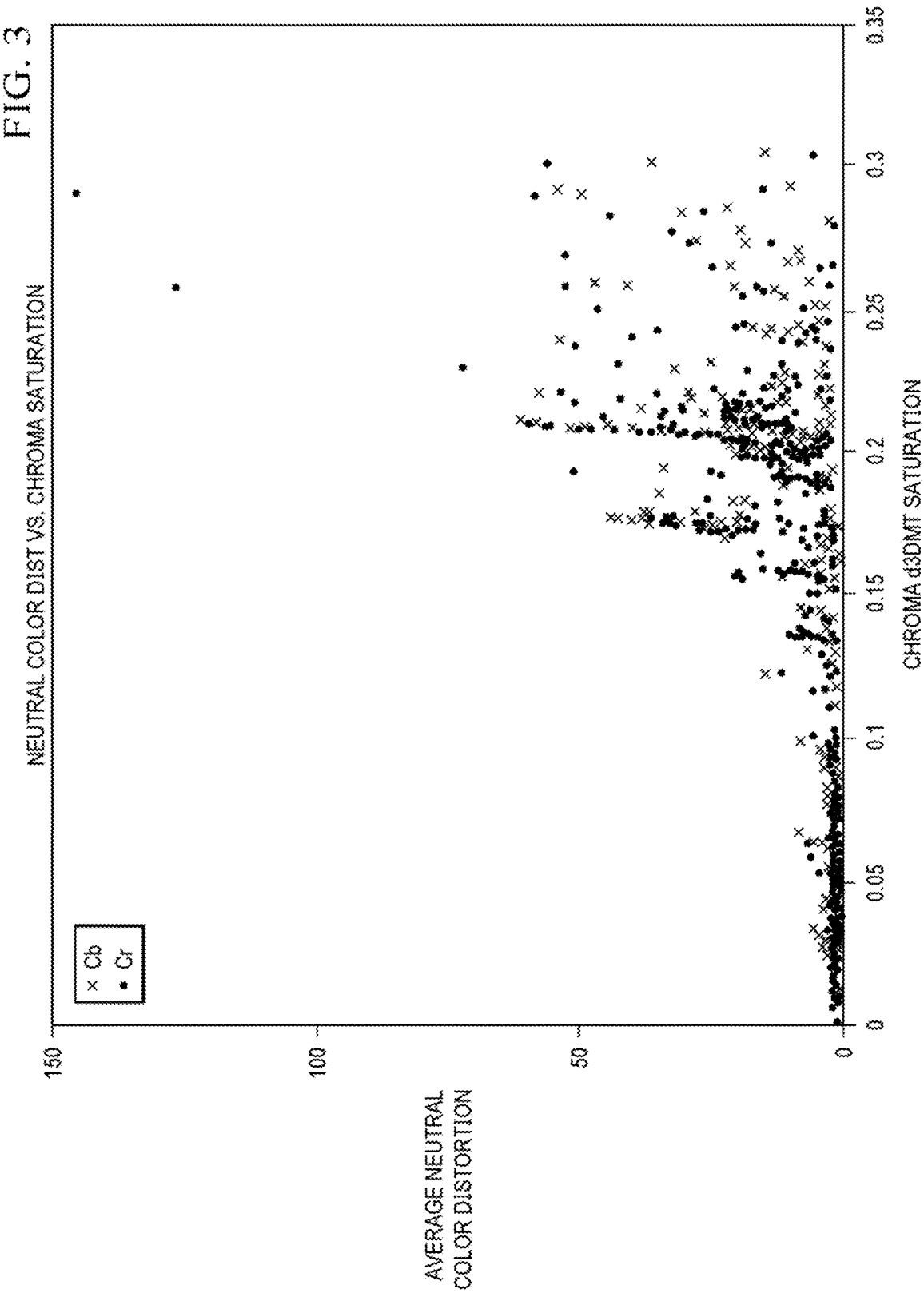
FIG. 3 illustrates an example chart of color distortion (average) vs. chroma saturation (d3DMT) for Cb and Cr channels.

First consider the case without neutral color preservation, namely, setting $w_t=0$. An example correlation between content saturation, $\beta_t^{(F)}$, and distortion in the gray-level bar, $d_t^{ch}(0)$, of both channels is shown in FIG. 3. The content saturation plays a role in effecting the neutral color deviation. The higher saturation of the content ($\beta_t^{(F)}$), the higher chroma distortion ($d_t^{ch}(0)$), giving a higher chance of showing a non-neutral color artifact. Note the image is in 12 bits precision for this example.

For each t test image, search the minimal value of weighting factor such that the neutral color deviation is smaller than a threshold $\delta$:

$$w_t^{opt} = \arg\min_{w_t}\{d_t^{ch}(w_t) < \delta\} \qquad \text{equation (56)}$$

Figure 4:
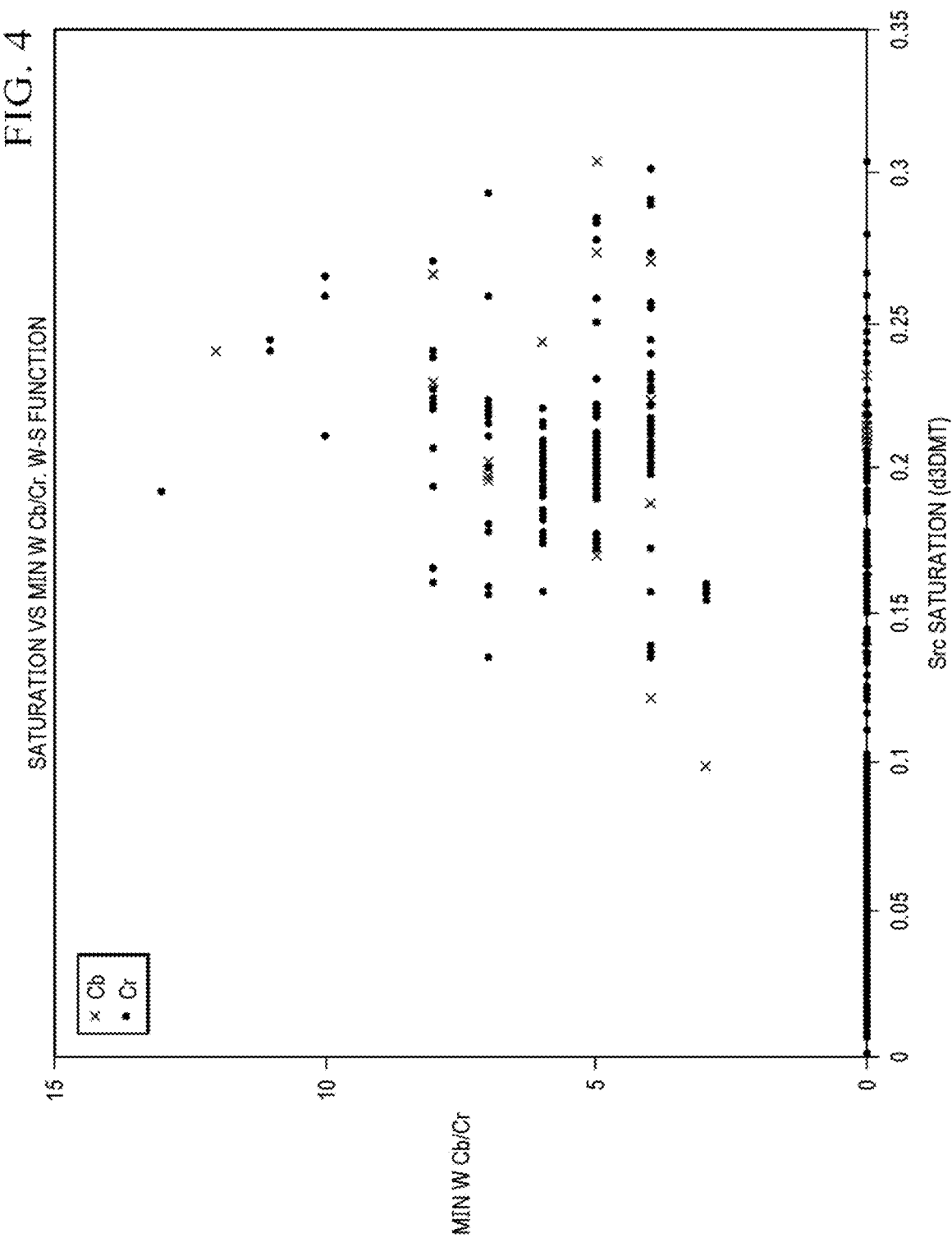
FIG. 4 illustrates an example saturation vs. minimum weighting factor for Cb and Cr channels.

FIG. 4 shows an example required $w_t^{opt}$ for $\delta=8$ (in 12 bits precision) vs content saturation $\beta_t^{(F)}$. Note that the higher saturation a content has, the higher weighting factor is needed to preserve the neutral color. Some situations do not need neutral color preservation (i.e., $w_t^{opt}=0$), for example FIG. 4 where the saturation is less than 0.1. Other situations might require different weighting values, such as in FIG. 4 where a saturation value under 0.13 can use a weighting value of 5, whereas higher saturation values might require weighting values of 10 or 15.

The non-neutral color artifact is rarely shown in an image showing a scene set in nature, but it is more frequently found in a very saturated synthetic dataset, especially in certain color spaces (e.g., R.2020).

Adoptive Weighing Factor Selection Method

The plot of saturation vs. min W (e.g., FIG. 3) can be used to find a piecewise linear function to envelop/upper-bound the data dots. When measuring the content saturation, $\beta_t^{(F)}$ one can determine the required weighting factor, $w_t$. An example is listed below:

$$w_t = f(\beta_t^{(F)}) = \begin{cases} 0 & \beta_t^{(F)} < 0.05 \\ 100(\beta_t^{(F)} - 0.05) & 0.05 \leq \beta_t^{(F)} \leq 0.2 \\ 15 & \beta_t^{(F)} > 0.2 \end{cases} \qquad \text{equation (57)}$$

Or it can simply be expressed as a clipping function:

$$w_t = f(\beta_t^{(F)}) = \text{clip3}(100(\beta_t^{(F)} - 0.05), 0.05, 0.2) \qquad \text{equation (58)}$$

Figure 5:
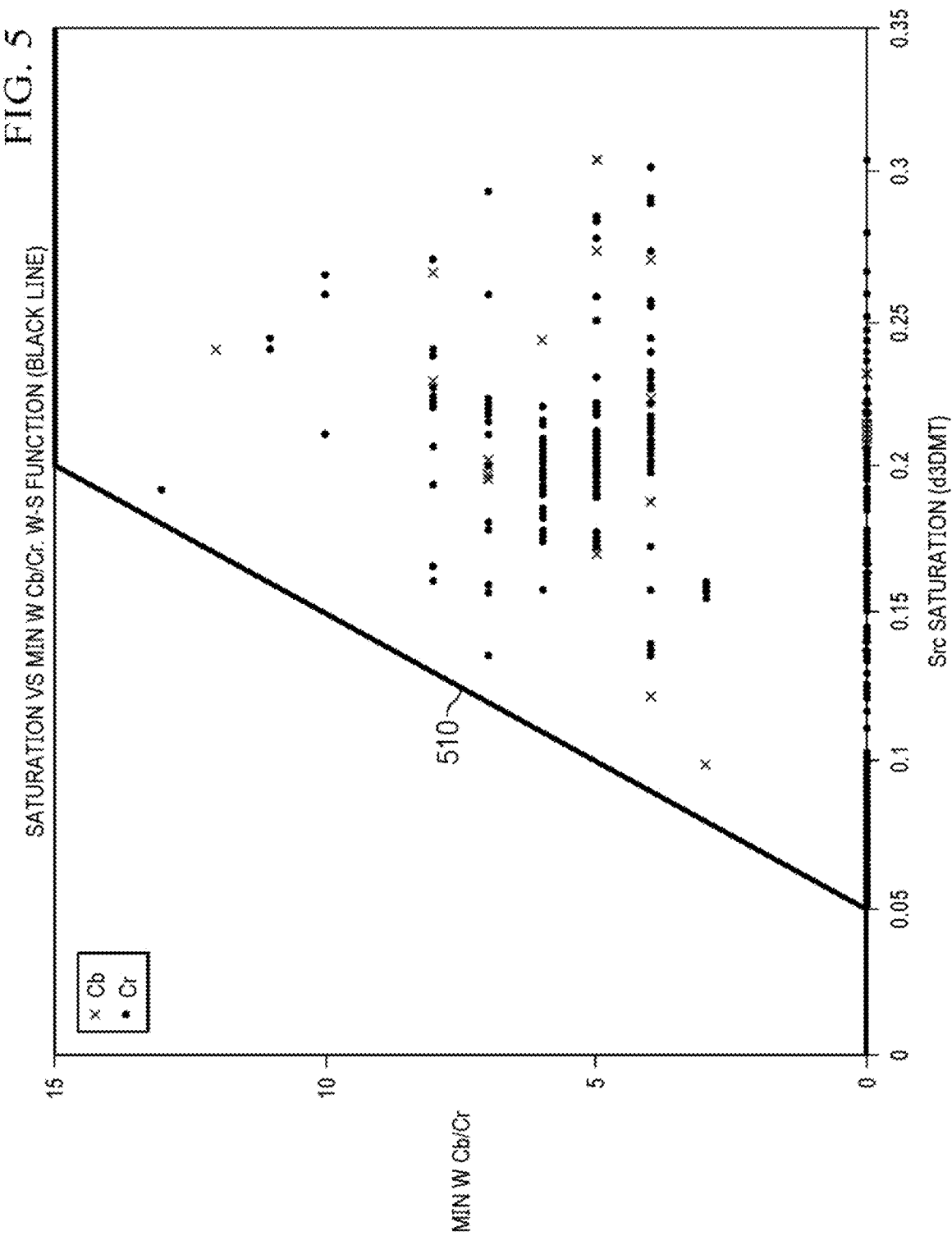
FIG. 5 illustrates an example of a clipping function derived from FIG. 4.

FIG. 5 shows this function (510) as a line clipped below 0.05 and above 0.2. Different profiles can produce different curves/functions.

Figure 6:
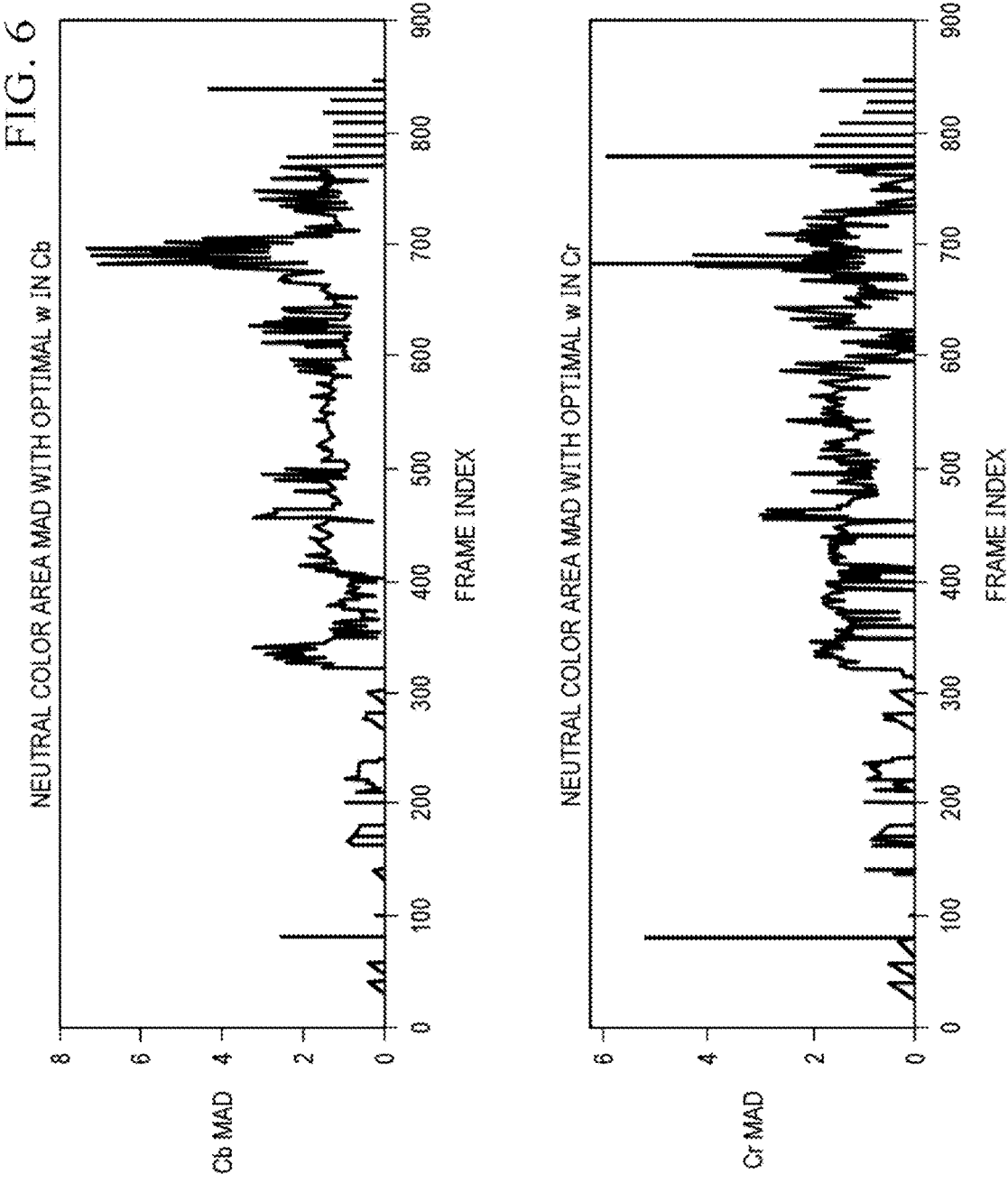
FIG. 6 illustrates example graphs of neutral color area MAD with optimal weighting factor in Cb and Cr.

FIG. 6 shows an example of the MAD, $d_t^{ch}(w_t)$, using the piecewise linear model $w_t = f(\beta_t^{(F)})$ for each frame. The MAD is within the tolerance range ($\delta=8$) in 12-bit precision. Subjective testing reveals the invisibility of this small neutral color shift.

FIG. 7 shows an example of the entire image MAD $D_t^{ch}(w_t)$ using the optimal $w_t = f(\beta_t^{(F)})$ for each frame. As shown in FIG. 7, most frames show negative values, which implies that the chroma is indeed improved with this neutral color preservation method. Few frames have $D_t^{ch}(w_t)$ larger than 0, but still less than ($\delta=8$). The performance degrades in MAD, but within the invisible range.

In some embodiments herein, a number of neutral color patches (N) is multiplied by a weighting factor (W). In some embodiments, N is fixed and W can be adjusted to provide a neutral color preservations. In other embodiments, W can be fixed and the number of neutral color patches can be increased (for example, to W*N). Typically, fixing N will be less computationally intensive. Fixing W bypasses the steps of determining W, and fixing W to 1 would not require multiplying W with N in the calculations.

Hardware Embodiments

One embodiment for the system is as part of a codec used in a encoder-decoder system. The MMR coefficients can be solved in an encoder (a processor/machine configured to receive an input of images—individual and/or video—and output a data stream with encoded images and metadata) with metadata sent to a decoder that either includes the coefficients themselves or includes a pointer to one of a set of pre-determined coefficients stored in the decoder. For example, the decoder can include a library of MMR coefficient sets covering various expected bias levels, the metadata informing the decoder which set to use for compatibility.

As described herein, an embodiment of the present invention may thus relate to one or more of the example embodiments, which are enumerated below. Accordingly, the invention may be embodied in any of the forms described herein, including, but not limited to the following Enumerated Example Embodiments (EEEs) which described structure, features, and functionality of some portions of the present invention:

EEE1. A method for encoding image data with neutral color preservation, the method comprising: building a dynamic 3D mapping table (d3DMT) from a first reference image and a second reference image, the first reference image having a different dynamic range than the second reference image; computing content color matrices based on the d3DMT; computing a content saturation from the d3DMT; computing at least one weighting factor from the content saturation; building a neutral color set; computing neutral color matrices based on the neutral color set; combining the content color matrices, the at least one weighting factor, and the neutral color matrices to solve multiple-channel multiple regression (MMR) coefficients; and providing metadata containing data related to the MMR coefficients to a decoder to allow backward compatibility for a single-layer bitstream.

EEE2. The method of EEE 1, wherein: the method is configured to provide the MMR coefficients which comprise data related to both forward path MMR coefficients and backward path MMR coefficients, wherein the forward path MMR coefficients are independently determined from the backward path MMR coefficients.

EEE3. The method of EEE 1, wherein: the method is configured to provide the MMR coefficients which comprise data related to only backward path MMR coefficients.

EEE4. The method of any of EEEs 1 to 3, wherein the content color matrices are in the form of A and b, where A is based on a vector of all non-zero bins and b is based on a vector of all non-zero bins and an observation chroma signal.

EEE5. The method of any of EEEs 1 to 4, wherein the MMR coefficients are evaluated using a least squared solution algorithm.

EEE6. The method of EEE 5, wherein the MMR coefficients are in the form of $A^{-1}b$.

EEE7. The method of any of EEEs 1 to 6, wherein the combining includes multiplying one of the neutral color matrices with one of the at least one weighting factor and adding that product to a corresponding one of the content color matrices.

EEE8. The method of any of EEEs 1 to 7, wherein the building the neutral color set comprises building a plurality of pseudo neutral color patches which do not occur in either the first reference image or the second reference image.

EEE9. The method of any of EEEs 1 to 8, wherein the at least one weighting factor comprises a forward path weighting factor and a backward path weighting factor.

EEE10. The method of any of EEEs 1 to 9, wherein the metadata includes a pointer to a set of MMR coefficients stored in the decoder.

EEE11. The method of any of EEEs 1 to 10, wherein computing at least one weighting factor includes comparing the content saturation to experimental data.

EEE12. The method of EEE 11, further comprising setting a linear function to envelope data points in the experimental data.

EEE13. An encoder, configured to perform the method of any one of EEEs 1 to 12, said encoder comprising: a processor; a signal input configured to receive the image; and a signal output configured to send the metadata.

EEE14. A method for encoding image data with neutral color preservation, the method comprising: building a dynamic 3D mapping table (d3DMT) from a first reference image and a second reference image, the first reference image having a different dynamic range than the second reference image; computing content color matrices based on the d3DMT; building a neutral color set; computing neutral color matrices based on the neutral color set; combining the content color matrices and the neutral color matrices to solve multiple-channel multiple regression (MMR) coefficients; and providing metadata containing data related to the MMR coefficients to a decoder to allow backward compatibility for a single-layer bitstream.

Equivalents, Extensions, Alternatives and Miscellaneous

Example embodiments that relate to color transformations under a coding-efficiency constraint for the coding of HDR video are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for encoding image data with neutral color preservation, the method comprising:
   building a dynamic 3D mapping table (d3DMT) from a first reference image and a second reference image, the first reference image having a different dynamic range than the second reference image;
   computing content color matrices based on the d3DMT;
   computing a content saturation from the d3DMT;
   computing at least one weighting factor from the content saturation;
   building a neutral color set comprising a plurality of neutral color image patches;
   computing neutral color matrices based on the neutral color set;
   combining the content color matrices, the at least one weighting factor, and the neutral color matrices to solve multiple-channel multiple regression (MMR) coefficients; and
   providing metadata containing data related to the MMR coefficients to a decoder to allow backward compatibility for a single-layer bitstream.

2. The method of claim 1, wherein the building a dynamic 3D mapping table (d3DMT) from a first reference image and a second reference image comprises determining 3D histogram bins having a non-zero number of pixels.

3. The method of claim 1, wherein the content color matrices are in the form of $A^{CC}$ and $b^{CC}$, where $A^{CC}$ is based on a vector of all non-zero bins and $b^{CC}$ is based on a vector of all non-zero bins and an observation chroma signal.

4. The method of claim 1, wherein building the neutral color set comprises generating a neutral color patch vector that collects a plurality of neutral color patches, wherein in a neutral color patch-luminance (Y) values are in [0, 1) and chroma values (Cb, Cr) are fixed at 0.5.

5. The method of claim 1, wherein the neutral color matrices are in the form of $A^{NC}$ and $b^{NC}$, where $A^{NC}$ is based on the neutral color patch vector and $b^{NC}$ is based on the neutral color patch vector and an observation chroma signal of neutral color represented by the center of all color axes.

6. The method of claim 1, wherein the combining includes multiplying one of the neutral color matrices with one of the at least one weighting factor and adding that product to a corresponding one of the content color matrices.

7. The method of claim 1, wherein:
the method is configured to provide the MMR coefficients which comprise data related to both forward path MMR coefficients and backward path MMR coefficients, wherein the forward path MMR coefficients are independently determined from the backward path MMR coefficients.

8. The method of claim 1, wherein:
the method is configured to provide the MMR coefficients which comprise data related to only backward path MMR coefficients.

9. The method of claim 1, wherein the MMR coefficients are determined using a least squared solution algorithm.

10. The method of claim 9, wherein the MMR coefficients are in the form of $A^{-1}b$.

11. The method of claim 1, wherein the at least one weighting factor comprises a forward path weighting factor and a backward path weighting factor.

12. The method of claim 1, wherein the metadata includes a pointer to a set of MMR coefficients stored in the decoder.

13. The method of claim 1, wherein computing at least one weighting factor includes comparing the content saturation to experimental data.

14. The method of claim 13, wherein the computing at least one weighting factor from the content saturation comprises finding a piecewise linear function to envelope data points in the experimental data, and wherein the piecewise linear function maps the measured content saturation to the at least one weighting factor.

15. An encoder, configured to perform the method claim 1, said encoder comprising:

a processor;

a signal input configured to receive the image; and a signal output configured to send the metadata.

* * * * *